United States Patent Office 3,028,364
Patented Apr. 3, 1962

3,028,364
PRODUCTION OF LINEAR AROMATIC POLYESTERS
André Jan Conix, Hove-Antwerp, and Urbain Leopold Laridon, Mortsel-Antwerp, Belgium, assignors to Gevaert Photo-Producten N.V., Mortsel, Belgium, a company of Belgium
No Drawing. Filed Apr. 1, 1958, Ser. No. 725,498
Claims priority, application Great Britain Apr. 2, 1957
3 Claims. (Cl. 260—47)

This invention relates to the production of polymeric materials and particularly of linear aromatic polyesters.

It is known to prepare aromatic polyesters by causing terephthalic acid and derivatives to react with glycols having 2 to 12 carbon atoms. The most valuable representative of the series of polyesters thus obtained is polyethylene terephthalate.

It has also been proposed to produce aromatic polyesters by substituting diphenols for glycols in reactions with dicarboxylic acids but it was found difficult or impossible to obtain polyesters having sufficiently high molecular weights. Accordingly for the production of polyesters of this type recourse has been had to the reaction between the free diphenol and the dihalide, usually the dichloride of the dicarboxyl acid, the reaction being carried out in the presence of a base for instance sodium hydroxide. It is very difficult, however, to obtain according to this method really high-molecular polyesters which can be formed in filaments and films; moreover the reaction is not smooth and the reaction mass tends to become pasty, the end product frequently being yellow to brown.

Products of high-molecular weight can be obtained, however, according to British patent specification No. 621,102, by condensing the dicarboxylic acid with the diacetate of the diphenol or by reacting the dicarboxylic acid with the diphenol in the presence of acetic anhydride.

In the copending U.S. patent application Serial No. 702,252, a process is described for the production of linear aromatic polyesters by polycondensation of diphenols with aromatic dicarboxylic acids according to which high molecular linear aromatic polyesters are obtained which dissolve in low boiling solvents by selecting as the diphenols those of the general formula

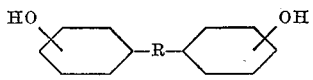

or chemically equivalent derivatives thereof, such as diacetates and other diesters, and as dicarboxylic acids those of the general formula

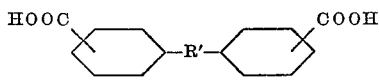

or chemically equivalent derivatives thereof, such as esters or anhydrides, wherein each of the R and R' represents an alkyl- or aryl-substituted methylene group or forms part of a cycloaliphatic ring, or one represents such a group or forms part of such a ring, and the other represents an oxygen atom or a methylene- or carbonyl group.

The polycondensation is carried out according to the above-mentioned copending application by heating the dicarboxylic acid and the diphenol, preferably in the form of the diacetate e.g. to a temperature of 305° C.

It is therefore an object of the present invention to provide new linear aromatic polyesters which dissolve quite well in low-boiling solvents and show high softening temperature. A further object of the present invention is to provide a suitable method for the production of such linear aromatic polyesters. Still further objects of the present invention will appear from the following description and claims.

It has now been found that if diphenols and dicarboxylic acids are condensed in a two-phase mixture of liquids, the acid chloride of the dicarboxylic acid being dissolved in organic liquid which is a solvent for the reaction product formed, and the bis-phenol being dissolved in another liquid which is immiscible with the former, it is possible to carry out the condensation reaction at room temperature and to obtain high molecular weight products which dissolve in low-boiling solvents.

It has further been found that this condensation method can be applied for obtained polyesters of high molecular weight, starting from a wide variety of bis-phenols and dicarboxylic acids.

According to the present invention, a process for the production of linear aromatic polyesters comprises reacting phenolate of a diphenol of the general formula

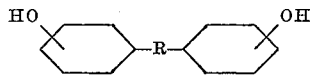

with a diacid chloride of an aromatic dicarboxylic acid of the general formula

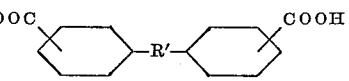

in which formulae the hydroxyl groups and the carboxyl groups may be in the para- or meta-position and wherein each of the R and R' represents a single bond or an alkyl-, aryl- or halogen substituted methylene group or a carbon atom which forms part of the cycloaliphatic ring, or one represents such a group or form parts of such a ring or such a carbon atom, and the other represents an oxygen atom or a carbonyl- or sulphonyl group, or a saturated hydrocarbon radical such as a methylene- or ethylene group, the said reaction being carried out by dissolving the aromatic dicarboxylic acid chloride in a solvent for the reaction product and adding thereto the diphenolate dissolved in a solvent which is immiscible with the solvent in which the acid chloride is dissolved while maintaining the temperature at substantially room temperature and precipitating the reaction product, e.g. by pouring the reaction mixture into boiling water. The following are examples of such radicals:

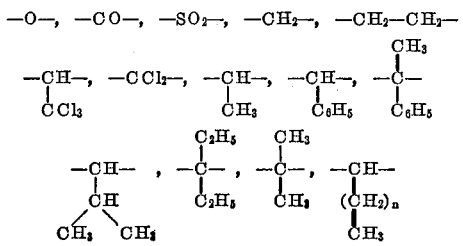

and

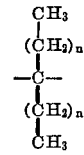

wherein n and n' each represents a positive number from 1 to 7,

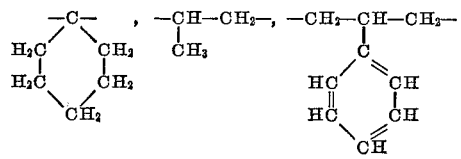

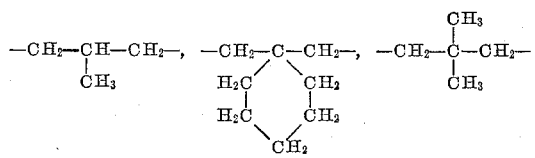

Especially high-molecular weights are obtained if the reaction is carried out in the presence of a suitable catalyst, such as a quaternary ammonium compound. Examples of such catalysts are trimethylbenzyl ammonium chloride, triethyl benzyl ammonium hydroxide, and triethyl benzyl ammonium chloride.

It is an important advantage of the present invention that the reaction may be carried out at room temperature and at atmospheric pressure in a liquid reaction medium consisting of non-miscible solvents which separately keep in dissolution the sodium diphenolate and the acid chloride together with the polyester formed.

We use water as the solvent for the diphenolates and methylene chloride as common solvent for the acid chlorides and the polyester formed during the reaction. Other water immiscible organic solvents can be used in association with water, such as dichloroethane, tetrachloroethane, benzene and toluene.

The diphenolates can be formed by dissolving the diphenols in water in the presence of equivalent quantities of metal hydroxides such as sodium- or potassium hydroxides. The dichlorides can be obtained a.o. by reaction of the respective dicarboxylic acids with thionyl chloride.

The following are examples of aromatic dicarboxylic acids the dihalide of which can be used for preparing the polyesters according to the present invention:

4,4'-dicarboxy-diphenyl,
4,4'-dicarboxy-diphenyl ether,
4,4'-dicarboxy-diphenyl sulphone,
4,4'-dicarboxy-diphenyl methane,
1,2- and 1,1-(4,4'-dicarboxy-diphenyl)ethane,
4,4'-dicarboxy-benzophenone,
4,4'-dicarboxy-diphenyl dichloromethane,
2,2-(4,4'-dicarboxy-diphenyl)propane,
2,2-(3,3'-dicarboxy-diphenyl)propane,
2,2-(4,4'-dicarboxy-diphenyl)1,1-dimethylpropane,
3,3-(4,4'-dicarboxy-diphenyl)heptane,
3,3-(3,3'-dicarboxy-diphenyl)heptane,
1,1-(4,4'-dicarboxy-diphenyl)propane,
1,1-(3,3'-dicarboxy-diphenyl)propane,
1,1 or 2,2-(4,4'-dicarboxy-diphenyl)butane,
1,1 or 2,2-(4,4'-dicarboxy-diphenyl)pentane.

The following are bis-phenols the metal phenolates of which can be used for preparing the polyesters according to the present invention:

1,1-(4,4'-dihydroxy-diphenyl)-cyclohexane,
1-phenyl-1,1-(4,4'-dihydroxy-diphenyl)methane,
1-phenyl-1,1-(4,4'-dihydroxy-diphenyl)ethane,
4,4'-dihydroxy-diphenyl-sulphone,
2,2-(4,4'-dihydroxy-3,3'-dimethyl-diphenyl)propane,
1,1,1-trichloro-2,2-(4,4'-dihdroxy-diphenyl)ethane,
2,2-(4,4'-dihydroxy-diphenyl)propane,
2,2-(4,4'-dihydroxy-diphenyl)1,1-dimethylpropane,
3,3-(4,4'-dihydroxy-diphenyl)heptane,
1,1-(4,4'-dihydroxy-diphenyl)propane,
1,1 or 2,2-(4,4'-dihydroxy-diphenyl)butane,
1,1-, 2,2- or 3,3-(4,4'-dihydroxy-diphenyl)pentane.

The invention includes polyesters obtained by reacting a mixture of two or more of the specified diphenolates with one or more of the specified aromatic dicarboxylic acid chlorides or mixtures of two or more of these acid chlorides with one or more of the said diphenolates.

In this way, polyesters are obtained containing the recurring structural units according to the general formula:

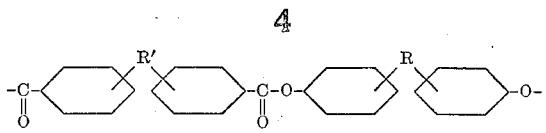

wherein R and R' represent radicals as defined above.

The following examples illustrate the invention without limiting, however, the scope thereof. The softening points are obtained on films prepared from the polyesters. The elongation of strips of films subjected to a load of 0.17 kg./mm.$^2$ is measured in function of the temperature. The temperature where a large rise in elongation is observed is taken as the softening temperature. It is to be emphasized that these temperatures have only a comparative value and are not to be confounded with melting temperatures. In fact they correspond more or less with glass transition temperature.

Example 1

A filtered solution of 3.15 g. of di-p-carboxy-phenyl-2,2-propane di-acid chloride in 20 cm.$^3$ of methylene chloride is brought into a vessel, fitted with a stirrer and a dropping funnel. To this solution is added 0.05 g. of triethylbenzyl ammonium chloride. Under stirring and during 30 minutes, a solution of 2.3 g. of di-p-hydroxyphenyl-2,2-propane and 0.8 g. of sodium hydroxide in 20 cm.$^3$ of water is dropwise added. The reaction temperature is held by cooling to approximately 25° C. The solution is subsequently stirred for 75 minutes. After this period, the reaction mixture became extremely viscous. The viscous mixture is brought into boiling water whereupon the polymer precipitates. The polymer is isolated by filtration and dried. The intrinsic viscosity of the polymer determined in dichloroethane solution at 25° C. is 1.9. The polymer dissolved in methylene chloride can be cast to tough, transparent, colorless films which are characterized by a low water-absorption and a high softening point (225° C.). This film material is particularly useful as base for photographic materials.

Example 2

A solution consisting of 100 cm.$^3$ of methylene chloride, 29.5 g. of the di-acid chloride of di-(p-carboxy-phenyl) ether and 0.5 g. of triethylbenzyl ammonium chloride is brought into a vessel, fitted with a stirrer and a dropping funnel. To this solution is dropwise added under vigorous stirring and during 35 minutes a solution of 22.8 g. di-(p-hydroxy-phenyl)-2,2'-propane and 8 g. of sodium hydroxide in 200 cm.$^3$ of water. The reaction mixture is subsequently stirred for 3 hours at a temperature of approximately 25° C. The viscous solution is brought into boiling water, whereupon the polymer precipitates, and can be isolated by filtration. The polymer has an intrinsic viscosity of 0.76 measured in a dichloroethane solution at 25° C. The polymer can be cast from a solution in methylene chloride to tough, transparent films which are characterized by a low water-absorption and a high softening point (200° C.). Similarly, the polymer can be moulded into transparent objects showing a high-impact strength and a particularly high-distortion temperature.

Example 3

A polyester is prepared by proceeding as in Example 2 but using 1 mol of the di-acid chloride of 2,2-(4,4'-dicarboxy-diphenyl)propane and 1 mol of the di-sodium salt of 4,4'-dioxy-diphenyl-phenyl methane of the formula

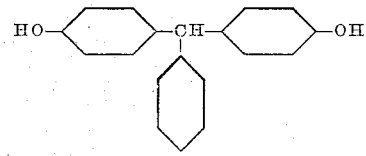

A polyester, soluble in low-boiling chlorinated hydrocarbons such as methylene chloride, is obtained. The softening point of the films cast from solution, is 218° C.

*Example 4*

A polymer is prepared by proceeding as in Example 3 but using as starting materials the di-acid chloride of 2,2-(4,4'-dicarboxy-diphenyl)propane and 4,4'-dioxy-diphenyl-1,1-cyclohexane of the formula

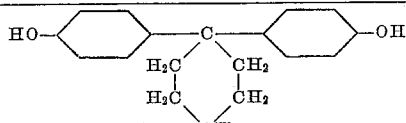

A polyester soluble in methylene chloride and showing a softening point of about 170° C. is obtained.

*Example 5*

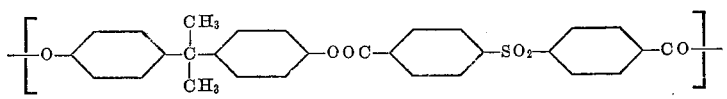

4.566 g. (0.02 mol) of 2,2-(4,4'-dihydroxydiphenyl)propane and 150 mg. of triethylbenzylammonium chloride were dissolved in 40.4 cm.³ of NaOH N and 20 cm.³ of 1,1,2-trichloroethane were added. At a temperature not exceeding 19° C., a solution of 6.864 g. of sulphone 4,4'-dibenzoylchloride in 60 cm.³ of 1,1,2-trichloroethane was added over a period of 15 minutes to the vigorously stirred mixture. Stirring was continued for an additional 150 minutes. Subsequently the upper aqueous layer was decanted and replaced by 50 cm.³ of distilled water; the mixture was again stirred for 30 minutes. This procedure was repeated once more. The polymer was precipitated into an excess of ethanol and is found to be soluble in methylene chloride, 1,2-dichloroethane, 1,1,2-trichloroethane and tetrachloroethane. From these solvents the polymer can be cast into colorless, transparent films showing good flexibility and a high softening point (200° C.). The intrinsic viscosity of the polymer, determined in tetrachloroethane solution amounts to 0.64.

*Example 6*

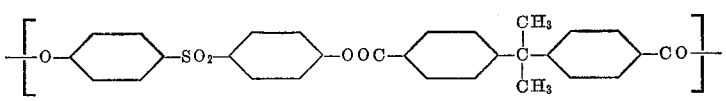

5.006 g. (0.02 mol) of 4,4'-dihydroxydiphenylsulphone and 200 mg. of triethylbenzylammonium chloride were dissolved in 40.0 cm.³ of NaOH N and 20 cm.³ of 1,1,2-trichloroethane were added. At a temperature not exceeding 20° C. a solution of 6.424 g. of 4,4'-(2,2-propylene)dibenzoylchloride in 40 cm.³ of 1,1,2-trichloroethane was added over a period of 20 minutes to the vigorously stirred mixture. Stirring was continued for an additional 4 hours, subsequently the upper layer was decanted and replaced by 100 cm.³ of distilled water. The mixture was again stirred for 30 minutes. Subsequently the upper layer was decanted and removed. Upon pouring the organic layer into an excess of ethanol, a fibrous white polymer precipitated which could be separated by filtration. The polymer is soluble in tetrachloroethane. From this solvent the polymer can be cast into colorless, transparent films showing good flexibility and a high softening point (220–250° C.). The intrinsic viscosity of the polymer, determined in tetrachloroethane solution amounts to 0.95.

*Example 7*

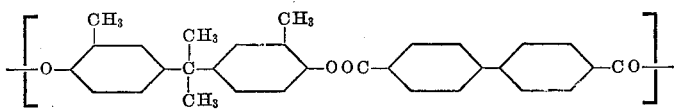

5.127 g. (0.02 mol) of 2,2-(4,4'-dihydroxy-3,3'-dimethyl-diphenyl)propane and 150 mg. of triethylbenzylammonium chloride were dissolved in 40.4 cm.³ of NaOH N. At a temperature not exceeding 23° C. this solution was added over a period of 20 minutes to a vigorously stirred suspension of 5.583 g. of diphenyl-4,4'-dicarbonyl-chloride in 50 cm.³ of 1,1,2-trichloroethane. Stirring was continued for an additional 4 hours, subsequently the upper layer was decanted and replaced by 100 cm.³ of distilled water. The mixture was again stirred for 30 minutes. Subsequently the aqueous layer was decanted and removed. Upon pouring the organic layer into an excess of ethanol, a fibrous white polymer precipitated which could be isolated by filtration. The polymer is soluble in methylene chloride, 1,2-dichloroethane, 1,1,2-trichloroethane, tetrachloroethane and dioxane; from these solvents the polymer can be cast into colorless, transparent films showing good flexibility and a high softening point (230–250° C.). The intrinsic viscosity of the polymer, determined in tetrachloroethane solution amounts to 1.45.

*Example 8*

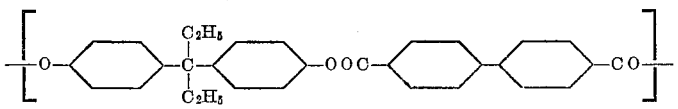

5.128 g. (0.02 mol) of 3,3-(4,4'-dihydroxy-diphenyl)pentane and 100 mg. of triethylbenzylammonium chloride were dissolved in 40.4 cm.³ of NaOH N. At a temperature not exceeding 20° C., this solution was added over a period of 15 minutes to a vigorously stirred mixture of 5.583 g. of diphenyl-4,4'-dicarbonyl chloride in 60 cm.³ of 1,1,2-trichloroethane. Stirring was continued for an additional 2 hours. Subsequently 40 cm.³ of 1,1,2-trichloroethane and 100 cm.³ of water were added to the viscous mixture and stirring continued for 30 minutes. Subsequently the upper aqueous layer was decanted and replaced by 100 cm.³ of water. The mixture was again stirred for 1 hour. Subsequently the polymer was precipitated into an excess of ethanol. The fibrous white polymer is soluble in methylene chloride, 1,2-dichloroethane, 1,1,2-trichloroethane and tetrachloroethane; from these solvents the polymer can be cast into colorless, transparent films showing good flexibility and a high softening point (260–290° C.). The intrinsic viscosity of the polymer, determined in tetrachloroethane solution amounts to 2.25.

Example 9

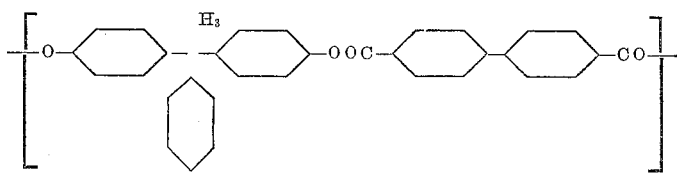

5.808 g. (0.02 mol) of 1,1-(4,4'-dihydroxy-diphenyl-phenyl) ethane and 150 mg. of triethylbenzylammonium chloride were mixed with 40.4 cm.³ of NaOH N and 10 cm.³ of 1,1,2-trichloroethane at a temperature not exceeding 10° C. Over a period of 20 minutes a mixture of 5.583 g. of diphenyl-4,4'-dicarbonyl chloride and 50 cm.³ of 1,1,2-trichloroethane was added at a temperature not exceeding 28° C. Meanwhile the reaction mass was vigorously stirred. Stirring was continued for an additional 3 hours, subsequently the aqueous layer was decanted and replaced by 100 cm.³ of distilled water; the mixture was again stirred for 30 minutes. Subsequently the aqueous layer was decanted and the polymer precipitated into an excess of ethanol. The fibrous white polymer is soluble in methylene chloride, 1,2-dichloroethane, 1,1,2-trichloroethane, tetrachloroethane and dioxane; from these solvents the polymer can be cast into colorless, transparent films showing good flexibility and a high softening point (280–309° C.). The intrinsic viscosity of the polymer, determined in tetrachloroethane solution amounts to 1.95.

Example 10

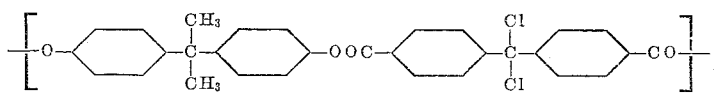

4.566 g. (0.02 mol) of 2,2-(4,4'-dihydroxy-diphenyl)propane and 150 mg. of triethylbenzylammonium chloride were dissolved in 40.4 cm.³ of NaOH N and 20 cm.³ of 1,1,2-trichloroethane were added. At a temperature not exceeding 5° C., a solution of 7.242 g. of 4,4'-benzophenone dichloride dicarbonyl chloride in 30 cm.³ of 1,1,2-trichloroethane was added over a period of 25 minutes while the mixture was vigorously stirred. Stirring was continued for an additional 3 hours at a temperature slowly rising to 20° C. Subsequently the upper aqueous layer was decanted and replaced by 100 cm.³ of distilled water. The mixture was again stirred for 30 minutes. Subsequently the aqueous layer was decanted and removed. Upon pouring the organic layer into an excess of ethanol, a fibrous white polymer precipitated which could be isolated by filtration. The polymer is soluble in methylene chloride, 1,2-dichloroethane, 1,1,2-trichloroethane, tetrachloroethane and dioxane; from these solvents the polymer can be cast into colorless, transparent films showing good flexibility and a high softening point (220–260° C.). The intrinsic viscosity of the polymer, determined in tetrachloroethane solution amounts to 0.90.

Example 11

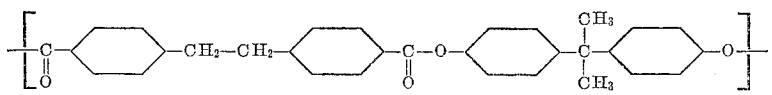

1.535 g. of 1,2-diphenylethane 4,4'-dicarbonylchloride and 0.025 g. of triethylbenzylammonium chloride were dissolved into 15 cm.³ of 1,1,2-trichloroethane. A solution of 1.14 g. of 4,4'-dihydroxy-diphenyl-2,2-propane and 10.2 cm.³ of NaOH 1.0077 N was added over a period of 10 minutes to the stirred solution at room temperature. Stirring was continued for an additional 3 hours. The upper aqueous layer was decanted, and the residue washed with 20 cm.³ water by stirring during 15 minutes. The aqueous layer was decanted and the residue was poured into ethanol. A fibrous white polymer was obtained, with an intrinsic viscosity determined in tetrachloroethane of 0.92 and a softening point of 180° C. It is soluble in methylene chloride, 1,1,2-trichloroethane, 1,2-dichloroethane, tetrachloroethane, dioxane and tetrahydrofurane.

Example 12

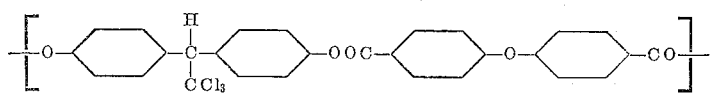

9.525 g. (0.03 mol) of 1,1,1-trichloro-2,2-(4,4'-dihydroxy-diphenyl)ethane was mixed with 45.5 cm.³ of NaOH 1.5 N at a temperature not exceeding —10° C. and a solution of 150 mg. of triethylbenzylammonium chloride in 50 cm.³ of methylene chloride was added. At a temperature not exceeding —5° C. a solution of 8.85 g. of diphenylether 4,4'-dicarbonylchloride and 150 mg. of triethylbenzylammonium chloride in 50 cm.³ of methylenechloride was added over a period of 10 minutes to the vigorously stirred mixture. Stirring was continued for an additional 5 hours at a temperature not exceeding 0° C. Subsequently the upper aqueous layer was decanted and replaced by 100 cm.³ of distilled water. The mixture was again stirred for 1 hour. Subsequently the aqueous layer was decanted and the organic layer was poured into boiling water; a fibrous white polymer could easily be separated. The polymer is soluble in methylene chloride, 1,2-dichloroethane, 1,1,2-trichloroethane, tetrachloroethane, dioxane and tetrahydrofurane. From these solvents the polymer can be cast into colorless, transparent films showing good flexibility and a high softening point (180° C.). The intrinsic viscosity of the polymer, determined in tetrachloroethane solution amounts to 1.3.

We claim:

1. A process for preparing highly polymeric linear polyesters, having an intrinsic viscosity of at least 0.4 when measured in a solution of a chlorinated hydrocarbon, which comprises condensing a diacid halide of an aromatic dicarboxylic acid, dissolved in an alkyl halide which is a solvent for the polyester formed, with an alkali metal salt of a bis-phenol dissolved in water, the aromatic dicarboxylic acid is a member of the group consisting of HO—CO—Ar'—Ar'—CO—OH and HO—CO—Ar'—R'—Ar'—CO—OH and the bisphenol is a member of the group consisting of HO—Ar—Ar—OH and HO—Ar—R—Ar—OH in which formulae each of the links Ar and Ar' represents a bivalent aromatic radical selected from the group consisting of an unsubstituted para-phenylene radical, a metaphenylene radical, a methyl substituted paraphenylene radical and R and R' each represents a bivalent radical selected from the group consisting of an ether radical, a carbonyl radical, a sulphonyl radical, a saturated lower hydrocarbon radical, and a carbon atom which forms part of a cycloaliphatic ring, at least one of the radicals R and R' is a bivalent saturated lower hydrocarbon radical selected from the group consisting of a lower alkyl-substituted methylene group, an aryl substituted methylene group, a lower alkyl- and aryl substituted methylene group, a halo-methyl substituted methylene group, a halogen-substituted methylene group and a carbon atom which forms part of a cycloaliphatic ring, whereby the polyester is dissolved in the alkyl halide as it is formed, permitting the formation of highly polymeric linear polyesters.

2. A process according to claim 1, wherein the condensation is carried out in the presence of a catalyst selected from the group consisting of the quaternary ammonium compounds.

3. A process according to claim 1 wherein sufficient water is added to the reaction mixture to precipitate the polymer formed.

References Cited in the file of this patent
UNITED STATES PATENTS

| | | |
|---|---|---|
| 2,595,343 | Drewitt | May 6, 1952 |
| 2,600,376 | Caldwell | June 17, 1952 |
| 2,808,394 | Speck | Oct. 1, 1957 |
| 2,839,508 | Williams | June 17, 1958 |

OTHER REFERENCES

Conix: Ind. Eng. Chem., 52, 147–150 (1959).